(12) United States Patent
Rizzo et al.

(10) Patent No.: US 9,380,028 B2
(45) Date of Patent: Jun. 28, 2016

(54) PROXY SERVER OPERATION

(71) Applicant: BRITISH TELECOMMUNICATIONS PUBLIC LIMITED COMPANY, London (GB)

(72) Inventors: Michael Rizzo, London (GB); Paul Martin Skirrow, London (GB)

(73) Assignee: British Telecommunications PLC, London (GB)

( * ) Notice: Subject to any disclaimer, the term of this patent is extended or adjusted under 35 U.S.C. 154(b) by 68 days.

(21) Appl. No.: 14/365,754

(22) PCT Filed: Nov. 29, 2012

(86) PCT No.: PCT/GB2012/000871
§ 371 (c)(1),
(2) Date: Jun. 16, 2014

(87) PCT Pub. No.: WO2013/088101
PCT Pub. Date: Jun. 20, 2013

(65) Prior Publication Data
US 2014/0359064 A1     Dec. 4, 2014

(30) Foreign Application Priority Data

Dec. 16, 2011  (EP) .................................... 11250928
Dec. 16, 2011  (EP) .................................... 11250929
Dec. 16, 2011  (EP) .................................... 11250930

(51) Int. Cl.
G06F 15/16     (2006.01)
H04L 29/06     (2006.01)
(Continued)

(52) U.S. Cl.
CPC ............ *H04L 63/0272* (2013.01); *H04L 45/74* (2013.01); *H04L 63/08* (2013.01);
(Continued)

(58) Field of Classification Search
USPC ....................... 726/12, 15; 709/217
See application file for complete search history.

(56) References Cited

U.S. PATENT DOCUMENTS 5,805,803 A    9/1998   Birrell et al.
6,701,374 B2   3/2004   Gupta et al.
(Continued)

FOREIGN PATENT DOCUMENTS

EP      1 278 112     1/2003

OTHER PUBLICATIONS

Office Action (18 pages) dated Dec. 31, 2015 issued in co-pending U.S. Appl. No, 14/365,761 of Rizzo, et al., filed Jun. 16, 2014.
(Continued)

*Primary Examiner* — Kyung H Shin
(74) *Attorney, Agent, or Firm* — Nixon & Vanderhye PC

(57) ABSTRACT

Data messages having secure data location addresses other than a predefined set are handled by a user terminal (14) in the normal way by setting up a secure tunnel (181) to a server specified in the data message (16). As this would prevent any proxy server from performing any processing on the content of the data message, messages that require the proxy to perform process on the data messages are processed separately. Data messages (251) incorporating secure media access locators identifying a predefined set of known media servers are identified by a message processing function (41, 410, 44) and passed to a proxy server over a connection between the user terminal and the proxy which does not tunnel past the proxy server, such that the proxy server may generate a redirected media access locator for return to the user terminal (14).

17 Claims, 10 Drawing Sheets

(51) Int. Cl.
*H04L 29/08* (2006.01)
*H04L 12/741* (2013.01)

(52) U.S. Cl.
CPC ........ *H04L63/0823* (2013.01); *H04L 63/0869* (2013.01); *H04L 63/126* (2013.01); *H04L 63/168* (2013.01); *H04L 65/40* (2013.01); *H04L 67/2814* (2013.01); *H04L 69/22* (2013.01); *H04L 63/0281* (2013.01)

(56) References Cited

U.S. PATENT DOCUMENTS

| | | | |
|---|---|---|---|
| 7,333,990 | B1 | 2/2008 | Thiagarajan et al. |
| 7,873,707 | B1 | 1/2011 | Subramanian et al. |
| 7,921,226 | B2 | 4/2011 | Mukherjee et al. |
| 8,332,484 | B2 | 12/2012 | Afergan et al. |
| 2003/0061387 | A1 | 3/2003 | Brown et al. |
| 2004/0015725 | A1 | 1/2004 | Boneh et al. |
| 2005/0198309 | A1 | 9/2005 | Li et al. |
| 2006/0041637 | A1 | 2/2006 | Jerrard-Dunne |
| 2009/0031368 | A1 | 1/2009 | Ling |
| 2009/0288138 | A1 | 11/2009 | Kalofonos |
| 2010/0071052 | A1 | 3/2010 | Mao et al. |
| 2010/0218248 | A1* | 8/2010 | Nice .................. H04L 63/0272 726/12 |
| 2011/0060845 | A1 | 3/2011 | Jungck |

OTHER PUBLICATIONS

European Search Report dated Jun. 27, 2012 issued in EP Application No. 11250929.4 (5 pgs.).
European Search Report dated May 24, 2012 issued in EP Application No. 11250930.2 (5 pgs.).
European Search Report dated Jun. 18, 2012 issued in EP Application No. 11250928.6 (6 pgs.).
International Search Report and Written Opinion of the International Searching Authority dated Mar. 12, 2013 issued in International Application No. PCT/GB2012/000874 (8 pgs.).
International Search Report and Written Opinion of the International Searching Authority dated Mar. 12, 2013 for International Application No. PCT/GB2012/000875 (9 pgs.).
International Search Report and Written Opinion of the International Searching Authority dated Mar. 12, 2013 issued in International Application No. PCT/GB2012/000871 (10 pgs.).
Abadi, Martin et al., "Secure Web tunneling", Systems Research Center, Digital Equipment Corporation, 130 Lytton Avenue, Palo Alto, CA 94301, USA, Computer Networks and ISDN Systems 30 (1998) 531-539, 1998 Published by Elsevier Science B.V.
International Search Report for PCT/GB2012/000871 mailed Mar. 19, 2013.
International Search Report for PCT/GB2012/000875, mailed Mar. 19, 2013.
International Search Report for PCT/GB2012/000874, mailed Mar. 19 2013.
Office Action dated Apr. 13, 2016 issued in related U.S. Appl. No. 14/365,761, 15 pages.
Rizzo, Office Action (14 pages) dated Jun. 25, 2015, issued in copending U.S. Appl. No. 14/365,761.
Abadi M. et al., "Secure Web tunneling", Computer Networks and ISDN Systems, North Holland Publishing, Amsterdam, NL, vol. 30, No. 1-7, Apr. 1, 1998, pp. 531-539.

* cited by examiner

PROXY SERVER OPERATION

This application is the U.S. national phase of International Application No. PCT/GB2012/000871 filed 29 Nov. 2012 which designated the U.S. and claims priority to EP 11250928.6 filed 16 Dec. 2011, EP 11250929.4 filed 16 Dec. 2011, and EP 11250930.2 filed 16 Dec. 2011, the entire contents of each of which are hereby incorporated by reference.

TECHNICAL FIELD

This invention in certain example embodiments relates to data retrieval processes, and in particular a process for retrieving data files from a content delivery database and delivering them to end users over a data network such as the "Internet". Such data files carry various forms of content, such as video or sound files, software upgrades, etc.

BACKGROUND AND SUMMARY

The present invention in certain example embodiments involves the selection and use of a content delivery network other than a default network selected by a content service provider, without modification to the content service provider's own service platform.

This application is one of three filed contemporaneously, each relating to embodiments that facilitate the operation of such services. The other two applications, filed on the same date as the present application, and claiming priority from the same three applications, are entitled "Network Terminal Validation" and "Data Retrieval Redirection". These three disclosures may be used individually, or together as will be described in the specification.

The following terms are used in the specification with the meanings given here. Reference is made, for illustrative purposes, to the conventional system depicted in FIG. 1.

Access Service Network (12, FIG. 1)—a data communications network, through which a user terminal may be connected to other network nodes to retrieve data files Authenticated Channel—a secure channel arranged to transfer data from a server to a client if and only if the server has been authenticated by the client e.g. one-way https. A Mutually Authenticated Channel is an Authenticated Channel where data can only be transferred if the Client and the Server have both authenticated each other, typically using X.509 certificates (e.g. https mutual).

Browser (13, FIG. 1)—An application operating on a user terminal which allows a user to select and access server applications at a remote source Client Player (14, FIG. 1)

An application, typically on a user terminal, for processing media files received from a data source and processing them for delivery to a user interface.

Client Proxy Configuration—a configuration in the User terminal to force it to send requests using specific Asset Locators via a Proxy Server such as a Redirection Server.

Content Delivery Network (CDN: 160, FIG. 1)—a distribution system able to deliver data files to user terminals on demand. (160, FIG. 1).

Content Distribution Provider—provider of a Content Delivery Network. Not necessarily associated with, or controlled by the Network Service Provider or Content Service Provider.

Content Service Provider—a provider of data for an original content server.

Device Identity—a unique device identifier, often taking the form of a certificate (and associated private key) that can be used by a server to authenticate the device. This may be burned into the device as part of the manufacturing process.

(Digital) signature—a mathematical scheme for demonstrating the authenticity of a digital message or document. A valid digital signature gives a recipient reason to believe that the message was created by a known sender, and that it was not altered in transit. Digital signatures are commonly used for software distribution, financial transactions, and in other cases where it is important to detect forgery or tampering.

Media Asset (280, FIG. 1)—a data file such as audio, video, html, for processing by a Player (Media) Asset Locator (22, 250 FIG. 1)—a data item comprising a unique identifier for a (media) asset, for example a URL or URI, (Universal Resopurce Locator/Identifier) typically comprising: a scheme (identifying a protocol such as http), a server location (such as an Internet domain) and an asset location on the server (such as a directory path and filename). The scheme may specify use of a secure connection e.g. https.

Media Selector—a system operated by a Content Service Provider that is used to determine an appropriate content delivery network and media asset locator for the purpose of delivering of a media asset to a specific user terminal.

Network Location—an identification or address of the device on a network, such as an IP address or hostname.

Network Service Provider—the provider or operator of an access service network

Original Content Server (16, FIG. 1)—server provided by, the Content Service Provider, from which data files are distributed either directly to users, or through a Content Delivery Network.

Proxy Server—a server that acts as an intermediary for requests from clients seeking resources from other servers. Examples include caching servers, load balancers, and redirection servers.

Public Key, Private Key—two complementary encryption keys (with associated algorithms) that allow the origin or destination of data to be confirmed. Data encrypted with one key can be decrypted with the other. The private key is only available to the user whose identity is to be confirmed, but the public key is made available to all users. This allows any users with the public key to confirm the origin of data encoded using the private key, and/or to ensure that data encoded using the public key can only be read by the holder of the private key.

Public key certificate (also known as a digital certificate or identity certificate)—an electronic document which uses a digital signature to bind a public key with information that identifies a person or an organization. The certificate can be used to verify that a public key belongs to an individual. The public key can be proved by a "challenge"—the challenger transmits a data message, encrypted using the public key, to the originator. This can only be decoded if the originator has the private key matching the public key. The originator then returns the decoded message to the challenger, which checks the decoded message it receives against the original message. The digital signature originates from a trusted $3^{rd}$ party certification authority which can vouch for the authenticity of the certificate.

Redirection Server (18, FIG. 2)—a server that accepts requests including Asset Locators from a Client and responds with a redirection message containing a different Asset Locator to that originally requested. The Redirection Server uses a look-up table or specific rules to generate a new. Asset Locator for each Asset Locator provided by the Client. A "Secure Redirection Server" is a Redirection Server which will only receive requests via an Authenticated Channel Signed Asset Locator—an asset locator that is securely restricted to consumption by a device with a known identity or network location and/or within an allowed time frame. The locator includes a constraint which is typically derived from data items such as: device identity, time, expiry time or time range, Asset Time Stamp, Asset Locator (e.g. uri), or source Network Location, and protected using a hash or encryption algorithm using a secret key to ensure it cannot be forged.

Time Stamp—an item of data indicating the time an asset was last created or modified, for example a time stamp is typically provided for each file managed by an Operating System or Filing System. In the present specification the time stamp is used to identify the period of validity of the asset, to prevent its use after that period has expired.

User Terminal (11, FIG. 1)—a device, such as a computer, handheld device or Set Top Box, typically in a customer's home, and used by the customer to retrieve data files from a remote source Media assets are available from a wide range of different data hosts, and can be routed over various access service networks, under the control of different service providers, to a range of user terminals. In a typical arrangement, content is identified by an internet address (Universal Resource Identifier—"URI"). The format of the URI does not necessarily indicate the nature of the content, and so there is no reliable way for the network, or the user terminal, to identify the type of content from the URI alone.

The URI may be accompanied by a digital signature in order to confirm that the client making the request is authorized to access the content delivery network. Examples are described in United States Patent Application US2009/031368 and European Patent Application EP1278112.

A Content Service Provider often has relationships with one or more Content delivery networks, and uses a media selector to identify the best CDN and associated Media Asset Locator to serve a given user terminal. The use of a media selector enables a Content Service Provider to use a CDN without losing sight of the requests for its content, and to enforce timing constraints without having to rely on precise synchronisation with the CDN. In particular, television "catch-up" content is often made available for a limited period only, but this limitation is difficult to police if the content is also duplicated in Caches operated by CDNs. Content may also need to be withdrawn at short notice, for example if the information in the content becomes out of date, or subject to a legal injunction. The original content provider can replace the content with some other response, but the CDN might continue to make available its cached copies.

A Network Service Provider may have a preferred Content delivery network which can be used to deliver a range of benefits including: lower network cost, use of prioritized delivery over the network, exemption from any broadband usage limits, and transcoding of assets for delivery to different user terminal types.

It may be cheaper for a Network Service Provider to use their preferred CDN in place of the Content Service provider's default CDN. For example the CDN may locate streaming servers close to the edge of the network, so as to minimize the distance over which media needs to travel in order to reach the user terminal.

The Network Service Provider CDN may also enable video content to be identifiable so that it can be prioritized over other data in order to avoid, or minimize the possibility of, exhaustion of buffered content at the user end, resulting in interruption of the content being viewed.

Some media assets, particularly video streams, can require a relatively high bit rate over a relatively long period, and so can make up a significant proportion of any usage limit applicable to an Internet user's account. Some service providers allow content from an authorized source, such as the website of a television broadcaster, to be exempt from such usage limits, for example because such content is paid for in some other way, such as a subscription or advertising revenue. It is therefore desirable that such content be identifiable, and this can be facilitated though use of the Network Service provider's choice of CDN.

Although the same URI (Universal Resource Indicator) might be provided by a media selector to all user terminals requesting content, it is often desirable to deliver content that has been configured to be appropriate for the type of user terminal requesting the content, for example the appropriate video format, bit-rate, meta-data etc. In particular, where a content service provider does not provide explicit support for specific user terminal types, the service provider may wish to transcode media assets into appropriate formats before delivering them to the user terminal. This might be achievable via use of an appropriate CDN with transcoding capability.

The Network Service Provider may also wish to monitor and control access, so that it can provide services tailored to its own customers. For example it may charge for certain material, or restrict access, for example to prevent content unsuitable for children from being downloaded during times when they are likely to be using the service. It may also substitute some content, for example to provide advertising or news more relevant to the user's location than that provided in the original content. These capabilities can all be facilitated through use of the Network Service Provider's choice of CDN.

One known example, disclosed for example in United States Patent Application US2010/0218248, provides for requests directed to a CDN by way of one gateway to be diverted by that gateway to allow access to the same CDN by way of another gateway. However, there are many reasons why a Network Service provider may require its customers to use a CDN other than the default CDN nominated by the Content Service Provider.

One way to achieve this would be for providers of such content to respond to data requests from subscribers of an approved network service provider by routing the requested data through a dedicated service platform (170, FIG. 1) hosted by the network service provider, instead of the content distribution provider's own network 160 to which the user would otherwise be directed by the media selector 15. However, this requires modification to the content provider's media selector platform 15 to identify and authenticate users permitted to access the dedicated platform 170. This can, be difficult to achieve, especially if more than one network service provider and/or more than one content provider are involved.

This raises the question as to how a Network Service Provider might itself redirection requests that are targeted at the Content Service Provider's choice of CDN to its own choice of CDN.

Techniques for re-direction of requests via a proxy redirection server are known in the industry. However these can give rise to a number of security related challenges in the specific context under discussion. Specifically:

(i) the Network Service Provider may wish to strengthen the security used in relation to signed media asset locators, so that customers do not gain illegitimate access to benefits (such as network prioritisation or usage volume exemption) for other data assets. Where a network service provider uses Carrier Grade NAT (network address translation), the network service provider may require a solution for signing media asset locators using the user terminal network address where the user terminal's public address seen by the content service provider is not the same as the private address seen by the network service provider's CDN, (ii) the content service provider would not want its own signed media asset locators to be compromised by a rogue user terminal using the proxy redirection server, (iii) if the content service provider specifies https for media delivery, then this requires special treatment to enable use of a redirection proxy, and Failure to address security concerns related to such re-direction could allow rogue users and/or devices to make use of network prioritisation facilities in the broadband access network to which they are not entitled, or to gain exemption from broadband usage policies to which they are not entitled, or to gain access to content to which they are not entitled.

Furthermore, standard re-direction techniques cannot be used where a content service provider media selector has responded with a media asset locator that is based on a secure scheme such as https. In such a situation, the proxy redirection would not normally be able to see the contents of the request, and to return an appropriate redirection response.

Some network providers have accommodated the current shortage of IPv4 addresses by consolidating several user addresses under the same public network address, allocating separate private addresses to the individual users—known as Carrier Grade Network Address Translation (CG-NAT). It is thus not always possible for a content delivery provider external to the network to distinguish and authenticate requests from individual users, as they may share the same public address. The external content delivery service can only determine whether it should deliver data to the public address, and cannot distinguish between users sharing that address. This makes it impossible for the content service provider's CDN to employ signed media asset locators based on network addresses, and means that URI's could be passed on to enable access by users not entitled to such access.

The present invention in certain example embodiments provides features of an alternative system which overcomes some of these difficulties whilst requiring no modification to the content provider's operating system. The embodiments of the applicant's co-pending applications, entitled "Network Terminal Validation" and "Data Retrieval Redirection" filed contemporaneously with the present application, provide further features which may also be used in co-operation with certain example embodiments of the present invention.

It is known to use a "proxy" configuration in which data messages, for example, content requests, addressed to one Internet address are sent to a proxy server. This allows the existence or characteristics of an origin server to be hidden, and can be useful for load balancing, termination on secure networks (behind a firewall), mobility, server-based decryption (SSL termination) etc. The proxy can be used, for example, to allow authentication of a user, in order to grant permission to access certain data, effectively acting as a trusted intermediary. A conventional proxy appears to a user terminal to stand in the place of the requested data source. Conversely, a "reverse proxy" appears to the data source to stand in the place of the actual requesting user terminal.

In particular it is also known to use a "redirection proxy" configuration in which content requests, addressed to a content delivery network are re-directed to another content delivery network by a proxy redirection server. Such a system is known from "Building Robust Network Services Through Efficient Resource Management" (Limin Wang, PhD dissertation, Princeton University, Nov. 2003) However, the system proposed therein would allow unlimited access to the second content delivery network. In particular, the proxy could be used by a rogue client to turn a URI with an expired/faked signature into a new URI with a valid signature. The URI could also be forwarded by one user to another, for whose use it was not intended, thus allowing multiple accessions of the second content delivery network by users not authorized to use it, and without the primary data supplier being aware of such accessions.

According to our co-pending application entitled "Network Terminal Validation", there is provided a method of operating a media asset location request redirection system to cause a user terminal to redirection first media asset location data relating to a first content delivery network such that the media asset location request is directed to a second content delivery platform, in which the request is directed to a proxy redirection server which translates the first media asset location data into second media asset location data relating to the second content delivery network, and use of the proxy redirection is controlled by an authentication process, in which the user terminal transmits a certificate to the proxy redirection and the proxy performs an authentication process to determine whether to accept the request for a media asset location. A further aspect of the invention provides a proxy redirection server for converting a first media asset location in a data request to a second media asset location according to a concordance, the redirection server being arranged to receive an authentication certificate with the data request, and comprising an authentication processor for checking the authentication certificate for its validity, and a response generator controlled by the authentication processor, for generating a response to the data request, including the second media asset location, if the validity check is successful. In a preferred arrangement, the response generator has means to generate a time stamp and expiry time as part of the response; indicative of the time the response to the data request is generated. Preferably, the response generator is responsive to device-specific data received in the data request to retrieve a media asset location selected according to the device-specific data.

In a complementary aspect, the co-pending invention provides a user terminal configured to cause a first media asset location associated with a first content delivery network to be converted to a second media asset location associated with a second content delivery network, under the control of a proxy redirection server, the user terminal being configured such that a request identifying a first media asset location is redirected to the proxy redirection server, and to receive an instruction to generate a request identifying a second media asset location in the second content delivery network, the device being arranged to transmit an authentication certificate to the proxy redirection server for validation prior to sending the request. This arrangement allows the service provider to maintain control of the provision of the redirection service to authorized user terminals. This invention in certain example embodiments therefore protects against use of the proxy redirection server as a way of bypassing validation of signatures provided e.g. using the processes described in U.S. Pat. No. 5,805,803 and EP1278112. By use of a mutually authenticated SSL (secure sockets layer) or TLS (transport layer security) connection between the user terminal and the redirection server, it can be ensured that the redirection server only accepts requests from genuine user terminals that are known to be trusted.

The user terminal may have the necessary certificate, and/or the control data for causing the processor to be configured according to certain example embodiments of the invention to operate this way installed on initial manufacture. Alternatively it may be installed subsequent to manufacture by providing a downloadable data file on a medium such as a computer disc, or secure download from another computer or over the data communications network itself. The user terminal is configured so that only URI's delivered from the proxy can be forwarded to the second CDN. This provides a secure means of enabling a media URL generated by a content service provider to be used in a different manner to that originally intended by the content service provider, as long as it is supplied via a user terminal that is trusted by the content service provider.

The user terminal has installed in its operating system a data file including an authentication certificate file, and operating instructions to configure the user terminal to operate accordingly. The co-pending application in certain example embodiments causes re-direction of a media request, initially addressed to a first content delivery network, so as to be redirected to a second content delivery network, in which use of a proxy server is controlled by a request redirection process, and the proxy performs a mutual authentication process with the user terminal to ensure that it is only accessible via legitimate trusted user terminals which are known to be secure. The proxy generates a new media asset locator pointing at the second content delivery network, derived from the initial media access location; and can also be used to increase the strength of any access constraints e.g. to identify the accession attempt as coming from an authorized user.

According to our other co-pending application, entitled "Data Retrieval Redirection" there is provided a method of operating an asset location request redirection system in which a user terminal redirects first asset location data relating to a first content delivery network to a redirection server which generates second asset location data such that the asset location request is directed to a second content delivery network, wherein the redirection server, on receiving the first media asset location request data generates a signed second asset location for transmission to the second content delivery network, and the second content delivery network uses data in the signed second asset location to determine whether the asset location request is to be met.

Another aspect of that invention provides a redirection server having a receiver for receiving first media asset location request data from a user terminal, a redirection processor for generating a second asset location, and a transmitter for transmitting the second asset location to the user terminal, wherein the redirection server comprises an authentication processor to generate a signature for inclusion with the asset location.

The co-pending application allows a request for media to be securely re-directed, such that any access restrictions applied to the original media are preserved, and can additionally be strengthened as required by the network service provider. This invention in certain example embodiments protects against use of the redirection server as a way of bypassing validation of signatures provided e.g. using the processes described in U.S. Pat. No. 5,805,803 and EP1278112. By use of a mutually authenticated SSL (secure sockets layer) or TLS (transport layer security) connection, it can be ensured that the second content delivery server only accepts valid requests, signed by the redirection server, and cannot be compromised by any action taken at the user terminal. The asset location request may be passed from the redirect server by way of the user's client player, but the user is not given the necessary information to read the request, or generate a request which can be accepted by the second content delivery server.

The co-pending application also enables the use of IP signatures in a Carrier Grade NAT environment where the public IP address seen by the content provider is different from the private IP address seen by the Internet Service Provider's CDN. The signed asset location may include a timestamp to determine an expiry period (or start/end time range) for the media asset location request, and an address identifying a legitimate user terminal, to confirm that the request has not been stored or transferred to another user terminal. The media asset location data generated by the proxy redirection server may include device-specific data configured according to the user terminal from which the request for data is received. The signed second asset location may include an address restriction specifying a network address from which the asset may be accessed. This allows the second content delivery network to confirm that the request has not been stored or transferred to another user terminal.

This enables a strengthening of the access restrictions associated with the asset, and protecting the interests of the network service provider over which the media asset is to be retrieved, as well as the interests of the content service provider which issued the original asset location.

The co-pending application therefore ensures that any media asset location sent to the second content delivery network as a result of the redirection request cannot be used to access expired material remaining in the second content delivery platform. In the preferred embodiment, the user terminal has a Client Proxy Configuration installed, to redirect requests to the secure proxy server in response to requests for data from specified media servers. Following a request for data from an internet address (universal resource locator—URI) associated with the first CDN, the secure proxy constructs a new URI and signature that is appropriate for the second CDN, and sends this back to the client via a redirection response, containing a signed URI, for example, an HTTP redirection response. The user terminal then uses this URI and signature, to access the required data from the second media server. The secure proxy only accepts requests from trusted authenticated clients, so it is not possible for a rogue client to use the proxy to bypass the original media server's URI signature. The proxy can be used to enhance the service, for example by increasing the strength of the signature e.g. from time-bound only, to add a requirement for a client IP, and can also be used to enable use of IP signatures in a Carrier Grade NAT (network address translation) environment, as will be described later.

Many Content Service Providers operate media selectors which return a URI based on a secure scheme, such as https. Conventional user terminal software handles secure data that is to be transmitted to a proxy server by attempting to set up a secure tunnel to the specified location via the proxy, so that only the user and the specified location have access to the secure data, and it is not visible to the proxy server itself (See FIG. 10, tunnel 181). However, such an arrangement would not be suitable if the proxy is required to process media asset location requests and issue re-direct responses, as the secure connection would prevent the proxy redirect server from reading the media asset request, or doing anything with it other than forward it to the specified URI.

This problem may be avoided by configuring the user terminal software according to certain example embodiments of the present invention, in which a communications terminal having a message compiler for transmitting data to predetermined addresses, having a secure connection means for transmitting data having a secure data location address to set up a secure tunnel to the address, and characterized in having a discriminator for identifying media access location data identifying a pre-defined set of known media servers, and second connection means for transmitting media access location data addressed to a secure location server specified by the media access locator, by way of a proxy, without setting up a tunnel whereby secure media access locators are passed to the proxy over a connection between the user terminal and the proxy for redirection by the proxy server.

In another aspect the invention provides a method for routing data messages having secure data location addresses wherein data having a secure data location address, other than media access locators, are transmitted from a user terminal by way of a proxy server by setting up a secure tunnel, by way of the proxy, to a server specified by the media access locator, and characterized in that secure media access locators identifying a pre-defined set of known media servers are passed to a proxy server over a connection between the user terminal and the proxy such that the proxy server may generate a redirected media access locator for return to the user terminal.

The connection between the user terminal and the redirection server may be provided by a mutually authenticated connection. The user terminal may be configured by transmitting a downloadable data file to the device for installation on the device, the downloadable data file including operating instructions to configure the device to operate according to certain example embodiments of the invention. As indicated above, the connection between the user terminal and the redirection server may itself be a mutually authenticated connection.

BRIEF DESCRIPTION OF THE DRAWINGS

An embodiment of the invention will now be described, with reference to the drawings, in which.

DETAILED DESCRIPTION

Figure 1:
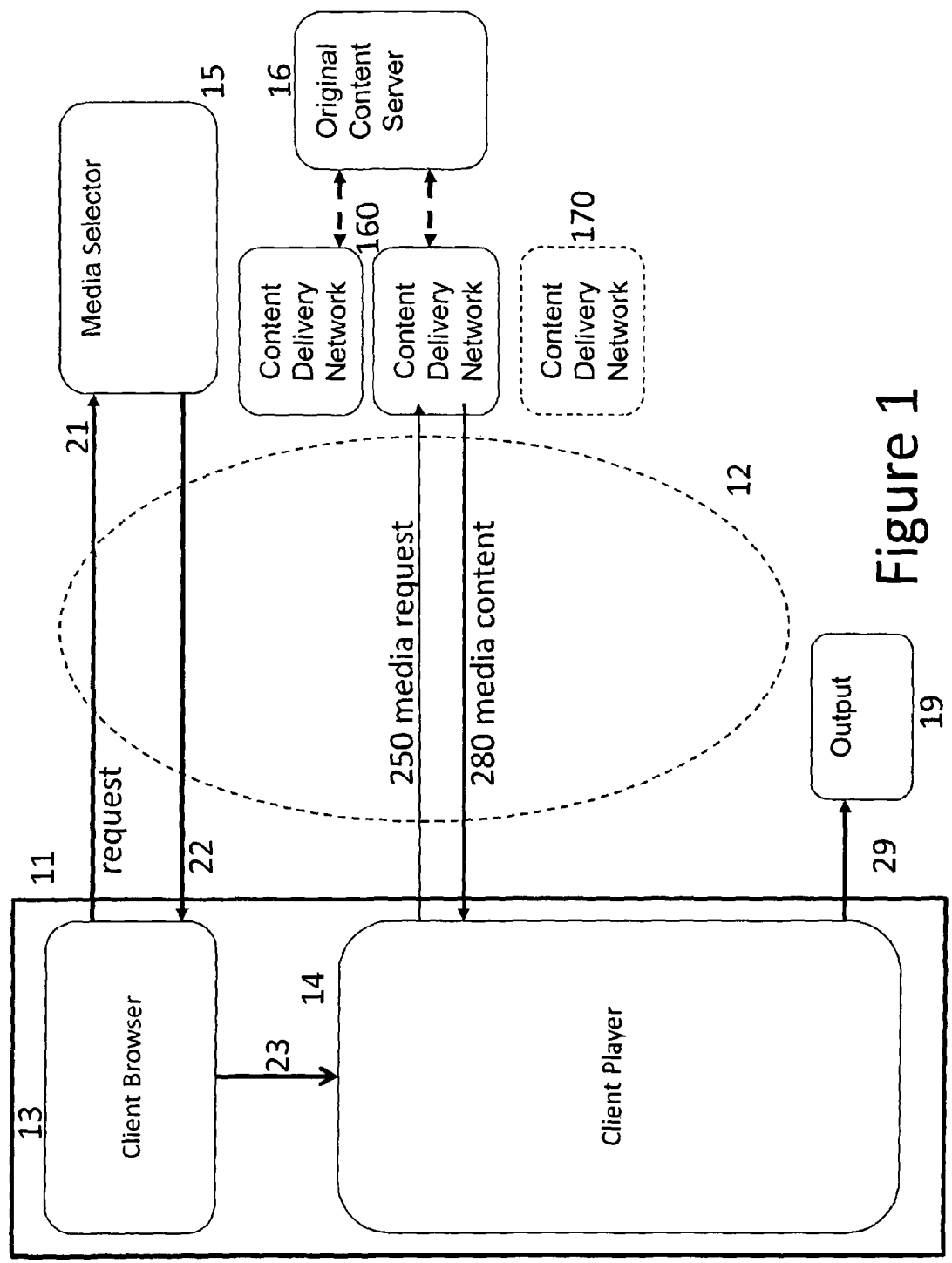
FIG. 1 is a schematic depiction of a conventional content delivery system, and has already been discussed
Figure 2:
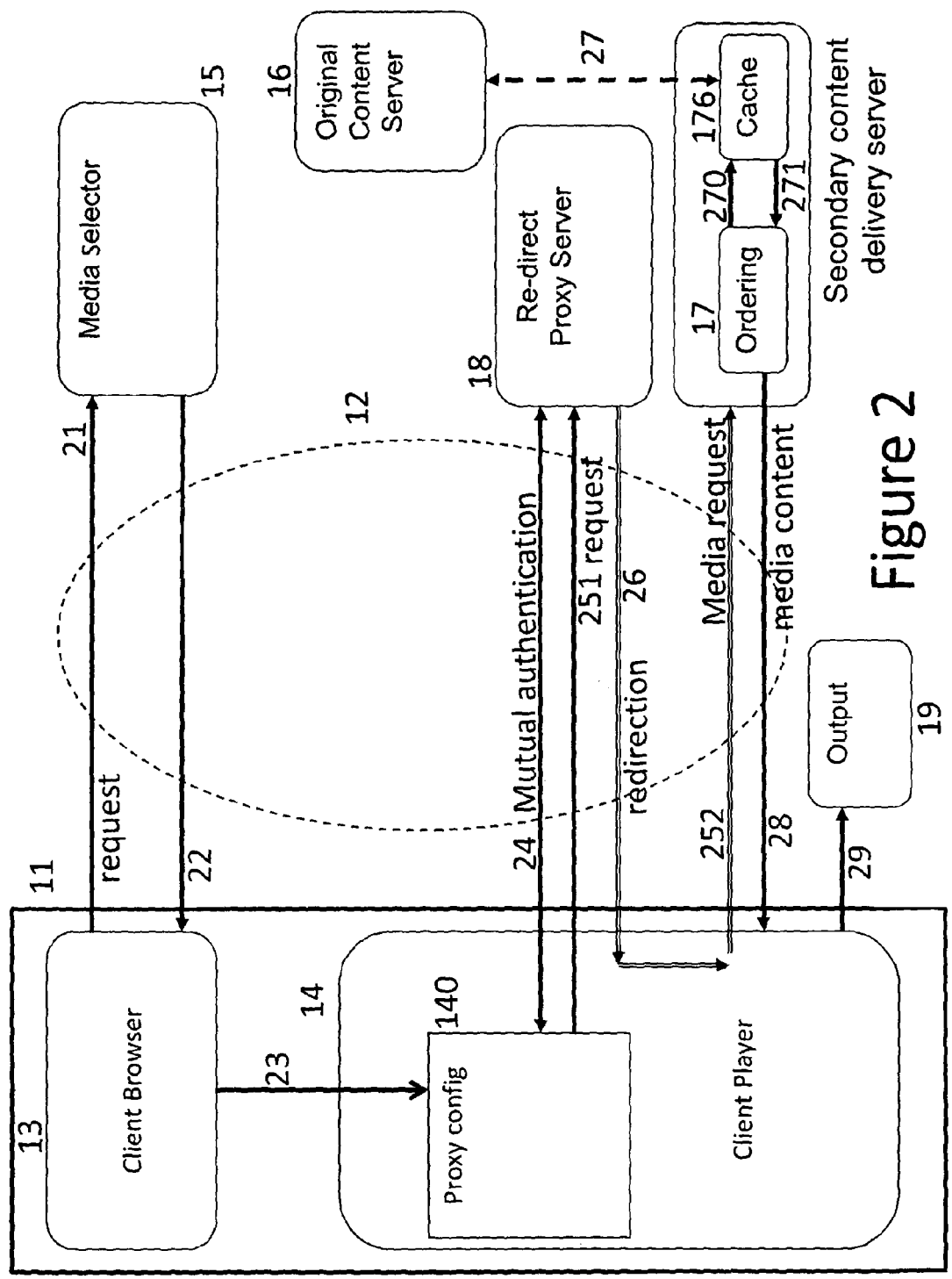
FIG. 2 is a schematic depiction of the various elements which co-operate to perform the invention, in certain example embodiments.

FIG. 1 and FIG. 2 both depict a user terminal 11 connectable to an access service network 12 such as the "Internet". The user terminal 11 can be a general purpose computer or a dedicated media terminal, and may be embodied in two or more intercommunicating devices. Among its functions, typically embodied in software, are a browser 13 for accessing data, a media player 14 for downloading video or audio streamed data, and an output 19 for displaying the data. In most practical applications all these devices would share the same connection to the internet 12.

FIGS. 1 and 2 also depict several functions operated by service providers and accessible from the user equipment 11 over the data network 12.

In the prior art system of FIG. 1 there is depicted a media selector platform 15 and a content delivery network 160, comprising a number of content delivery servers 160, which store content for download to users on request. These platforms derive this content from an Original Content Server 16, which they access as required if the content is not already stored on the individual server 160. The media selector platform 15 provides a listing, indexing or cataloguing function, and identifies the internet address (URI) of content stored in the Original Content Server 16 for access by the user. These functions are typically under the control of the content service provider.

The process followed by this equipment is illustrated in FIG. 1. In order to access viewable material, a user uses the browser 13 to access a content catalogue of available material, searchable for example by genre, title, date made available, etc, from which the user may select a item. Once the item is selected, the media selector 15 is invoked by the browser 13 to obtain a media asset location URI for that item. The platform 15 returns a message to the browser 13 identifying the media asset location for the selected content, in the form of a URI (step 22).

The browser 13 forwards the media asset location to the media player 14 (step 23). In a conventional system the client player then transmits a request 260 to the first delivery platform 16 hosted by the original content provider, using the URI in the media asset location message. The delivery platform 16 uses the media asset location to determine the content to be delivered, which it then returns to the media player 14 (step 280) for display 19 (step 29). If the media asset location data is not valid the delivery platform returns an error message. Reasons for such invalidity may include time expiry—the content is no longer available for access. This prevents users from storing media asset location codes, or sharing them with other users, for later access.

Figure 3:
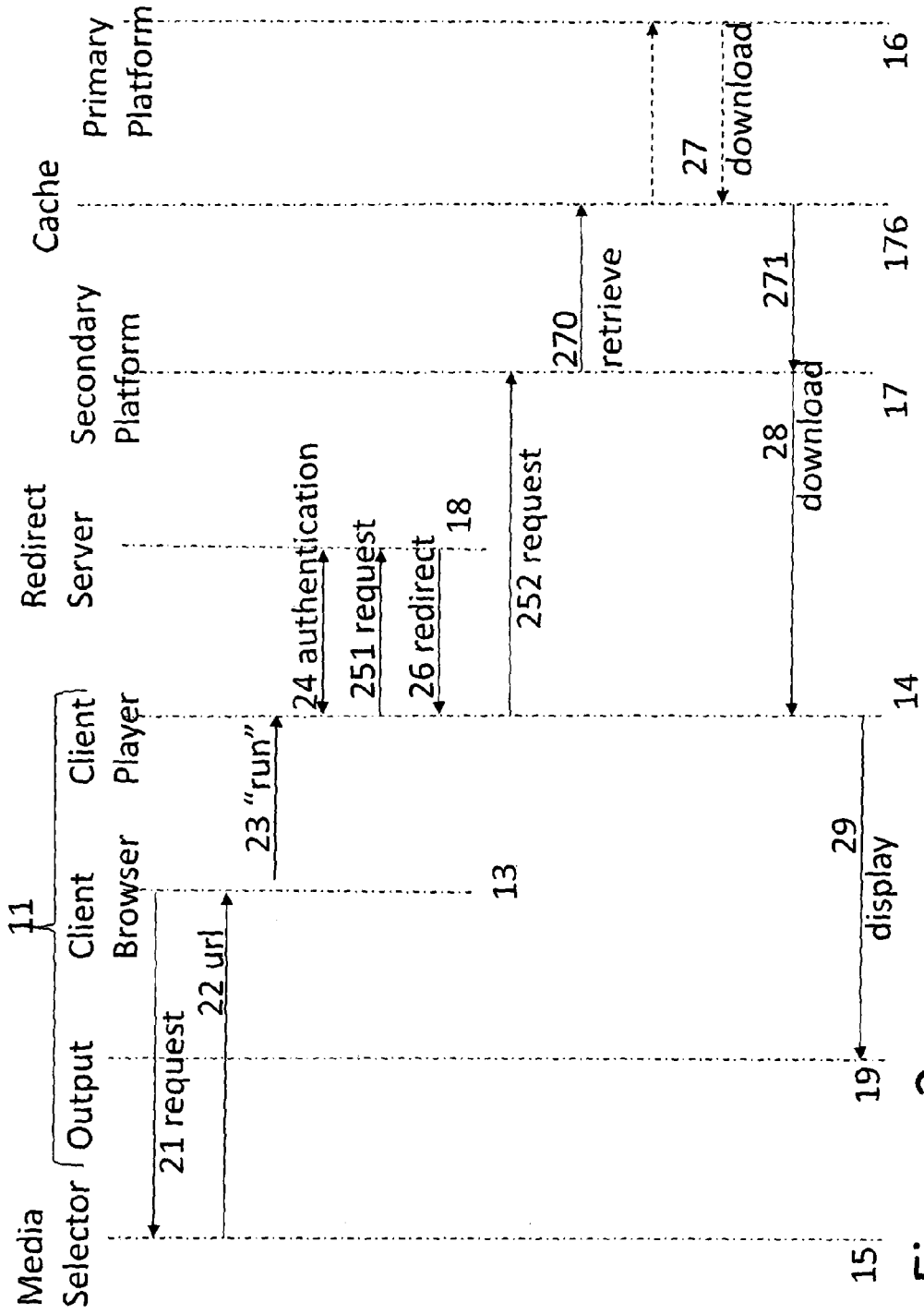
FIG. 3 is a sequence diagram illustrating the processes performed by these elements according to certain example embodiments of the invention.

As already described, accessing a media delivery platform 16 over a standard data connection causes some difficulties, and there may be benefits to a network service provider hosting its own content delivery platform 17. FIG. 2 depicts an arrangement using such a secondary content delivery server 17 which, like the content delivery servers forming the primary content delivery network 160, can also download content to users on request either by retrieving such content from the Original Content Server 16, or from a cache 176 of data that has previously been so retrieved. FIG. 3 is sequence diagram illustrating the processes operated by this system.

Data is downloaded from the originator's delivery platform 16 once (step 27), (e.g. in response to the first customer request for it) and subsequently re-used for any subsequent requests. As the platform 17 is typically much nearer the customer terminal 11, the network capacity required for delivery is reduced.

To encourage use of the platform 17, operators may exempt downloads 28 from the platform 17 from counting towards the customer's usage limit. Techniques such as prioritisation of streamed data are also possible when the network operator has end-to-end control of the download 28 between the delivery platform 17 and user media player 14.

It is desirable to limit access to this second content delivery server 17 to a specified category of users, so that other users are directed to the default network 160 provided by the content service provider. It is also desired to achieve this without modification to the content service provider's own service platform 15, 16. This is achieved this by using a redirection process mediated by a redirection server 18. The process is made subject to a validation process, typically under the control of a service provider, with whom the user 11 has a trusted (validated) relationship.

In order to access the platform 17, the media player 14 of an authorized terminal 11 is configured to convert any media asset location code it receives so that the request is handled by the platform 17 instead of the originator's platform 16. In practice this is done using a redirection server 18, which provides a concordance between the address of the original content platform 16 and the address of the content platform 17. (For load balancing purposes and other reasons this concordance may vary over time, so the user terminal 14 cannot do the translation itself).

Figure 4:
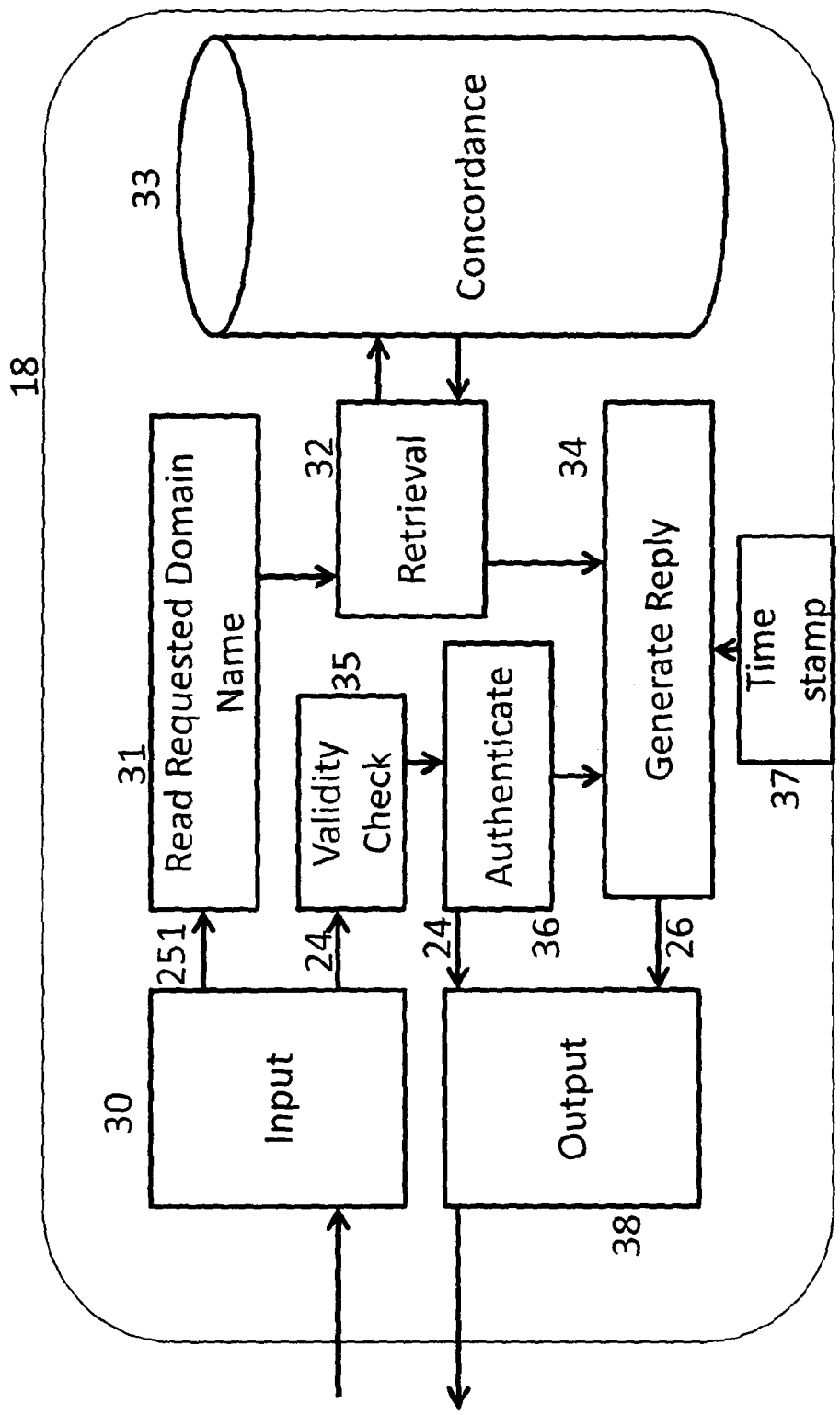
FIG. 4 is a schematic diagram illustrating the functional elements of the redirection server in more detail

The functional elements of the redirection server 18 are illustrated in more detail in FIG. 4. It should be understood that these elements may be embodied in software running on a general purpose computer.

The redirection server 18 has an input 30 for receiving redirection requests 24 from a user terminal 14 which has been configured (through an installed application 140) to identify requests addressed to the primary content delivery network 160 and to transmit them instead to the redirection server 18. The redirection server comprises a reader 31 for identifying the requested domain name, a retrieval system 32 for retrieving a corresponding proxy domain name from a concordance store 33, a message generator 34 for embodying the retrieved domain name in a new message for return to the client 14 through an output 38. Further features 35, 36, 37 of FIG. 4 will be described later.

It would be possible for a user to pass a URI received from the redirection server 18 to other, unauthorized users (not subscribers to the service provider hosting the delivery platform 17), allowing them to also access content from the delivery platform 17. Moreover, a user could store the URI to allow multiple accessions of the same stream from the delivery platform 17. Furthermore, the platform 17 does not have visibility of the time stamp data controlling access to the primary content platform 16, so out-of-date content may remain on the platform 17 after it has ceased to be available from the originator's own service, or has been modified, which would allow a user who has stored the URI to continue to retrieve it.

Such delayed accessions are undesirable for the original content provider, who would lose control of distribution of the content itself, for instance if the information becomes out of date, or has to be withdrawn for legal reasons. Multiple accessions of the delivery platform 17, without each requiring an initial interaction 21, 22 with the content provider's own platform 15, would also result in the content provider losing information on viewing statistics, which has implications for programme popularity ratings, royalties due to the copyright owners and performers, etc.

Unauthorized access by users not subscribing to the service provided by the delivery platform server 17 would also result in a loss of revenue to the service provider.

To avoid these difficulties, a process will now be described which allows verification of both the identity of the user and the validity of the original media asset location code. The interaction 24, 25 between the user media player 14 and the redirection server 18 is subject to an authentication process 35, 36. This will be referred to as mutual authentication because the client and server are both required to prove their authenticity to each other. In particular, the client (user terminal 11) is required to prove to the redirection server 18 that it is authorized to have access to the secondary content delivery platform 17. It can be arranged such that the necessary configuration software to access the redirection server 18 includes a public key certificate and a "private" key, wherein the public key certificate can be checked for authenticity by a "public" certification authority key stored in the redirection server 18 for use by the validity checker 35.

In order to achieve this, a proxy configuration 140 is installed in the client player device 14. This configuration can be installed by any suitable secure means, typically by being "burnt in" to the device on manufacture. However, a download from the service provider may be possible if a secure means of doing so is available as will be discussed with reference to FIG. 5. Provided that the service provider has control of the installation of this configuration 140, its presence on the device 14 is confirmation that the device is authorized to access the redirection processor 18.

The functional elements of the client player 14, as configured by the proxy configurator 140, are illustrated in FIGS. 5 to 8, which together illustrate the various information flows that take place. The various components are an input 40, an output 45, a processor 41 for handling incoming messages, a redirection store 42 for maintaining a concordance of redirection addresses, a certification store 43 for maintaining an authenticity certificate, a message compiler 44 for assembling outgoing messages, a streaming compiler 46 for processing streamed content, including decompression, buffering and other functions, and a central processor 47 for co-ordinating the operation of the other functions 40-46.

Figure 5:
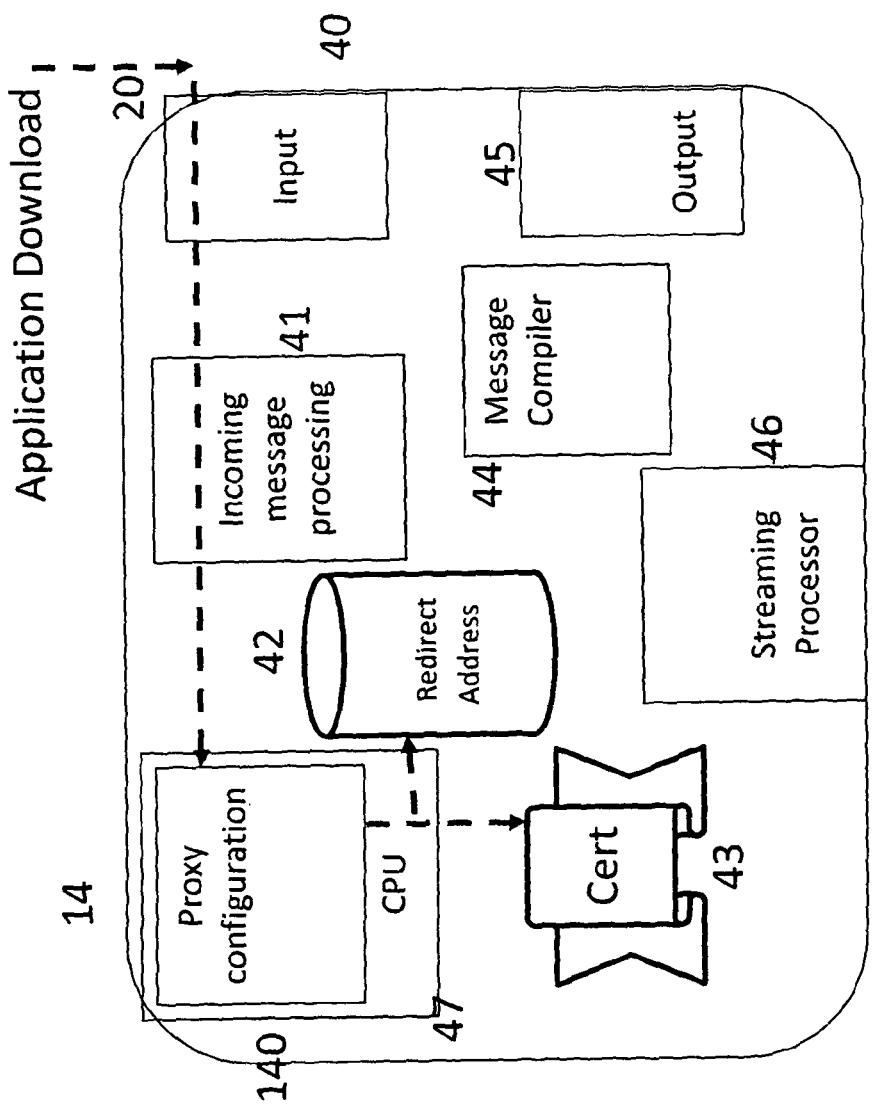
FIG. 5 is a schematic diagram illustrating the functional elements of a client player configured to operate according to certain example embodiments of the invention, and illustrates the configuration process itself.

The configuration process itself may be performed by software installed in the client player 14 on manufacture or, as illustrated in FIG. 5, by download from a storage medium such as a magnetic disc, or from a technician's computer during a site visit, or by download over the internet from a site managed by the service provider.

The download 20 is delivered through an appropriate input device 40 and installed on the CPU 47, which stores the appropriate redirection instructions and certificate in the respective stores 42, 43. Downloading may also be used to update subscriber details, for example to renew a certificate to confirm payment of a subscription for the service.

The certificate 43 can be used for other purposes in addition to the redirection process 42, and the two elements do not necessarily have to both be loaded as part of the same process. So for example the certificate 43 might be burned in on manufacture, whilst the proxy configuration 42 might be downloaded as part of a user terminal software upgrade at a later stage, using the process illustrated in FIG. 6.

Figure 6:
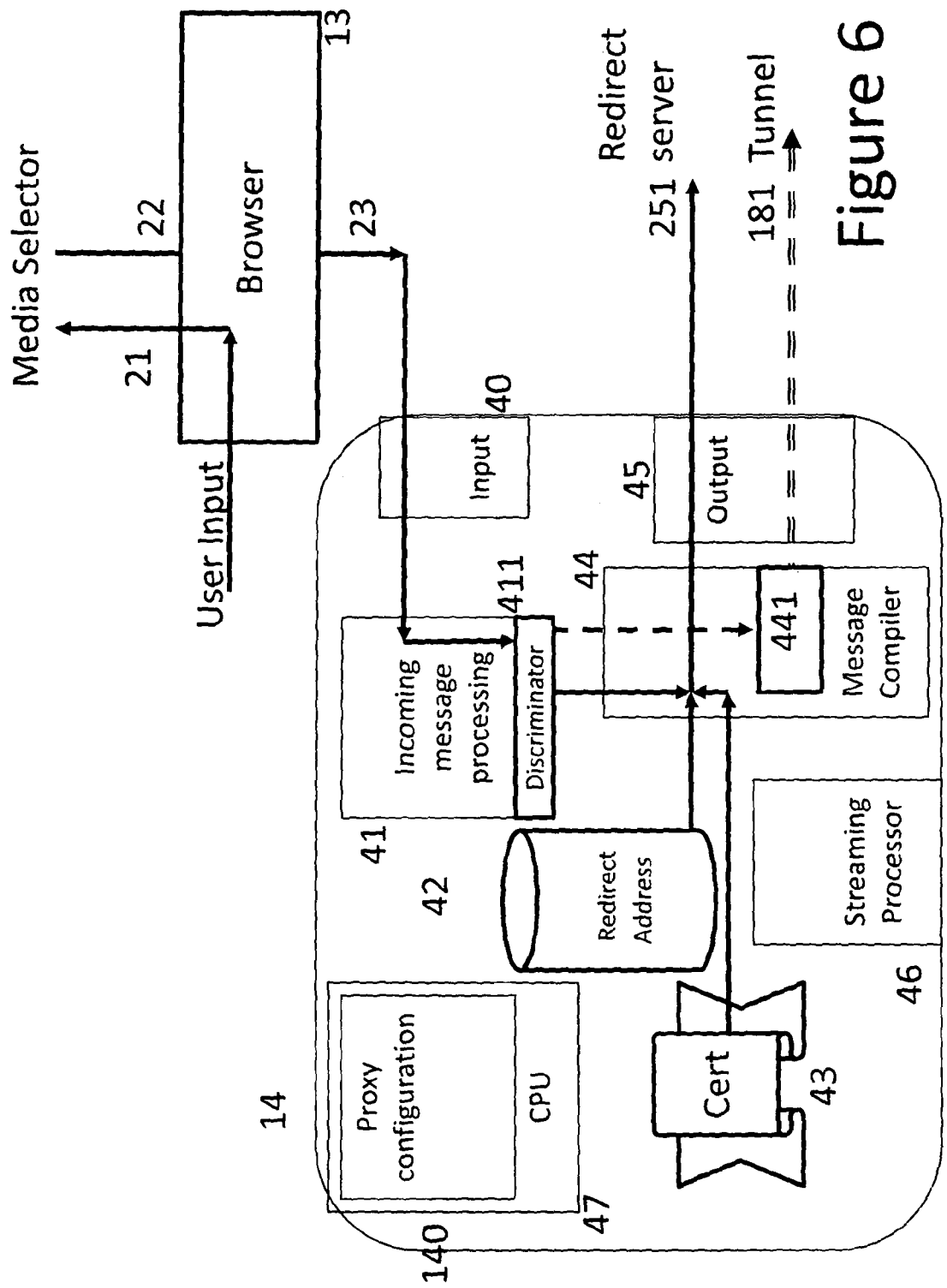
FIG. 6 is a schematic diagram illustrating the functional elements of a client player configured to operate according to certain example embodiments of the invention, and illustrates a first redirection step

As shown in FIG. 6, in operation, when a user makes an input 21 through the browser 13 to the media selector 15 to request an item of media content, the media selector returns a media asset location 22 to the browser which forwards it to the media player 14 (step 23). The incoming message processor 41 reads the media asset location and, under the control of the redirection address function 42 (which has been programmed by the configuration 140) determines if the media asset location address 23 meets predetermined criteria identifying it as suitable for redirection. If the media access location is so identified, the compiler 44 incorporates it in a message 24, to be forwarded via the output 45 to the proxy redirection sewer 18.

Before the message 24 can be sent, a secure connection has to be created between the user terminal 11 and the proxy redirection server 18. The redirection server 18 has a validity checking system 35 operating in parallel with the redirection processor 31-33. The mutual authentication process 24 involves the transmission by each party of a "public key certificate": a data string including identification details, including the public key, together with a copy of the same data, or a string derived from it, which has been encrypted by a trusted third party certification authority's private key. Each party can thus use the public key in the certificate itself to verify that the certificate originates from the owner of the respective private key.

If the check 35 identifies the presence of a valid certificate, an authentication processor 36 permits redirection data requests to be processed (31-33) and applies a signature to the redirection messages compiled in the message generator 34, together with a time stamp 37, and transmits it back to the requesting device through the output 38. Alternative messages may be generated if the validity check fails.

Public key certificates are used for the purpose of verifying the identity of the client (by the redirection server) and the redirection server (by the client). This is done at the connection-establishment stage, which creates a secure mutually-authenticated channel for subsequent communication of a media request.

Digital signatures are used to protect the media asset locators 22, 26, that are returned by both the primary CDN 21 and the proxy server 18. The media asset locators contain information such as a time expiry and/or IP address restriction which cannot be tampered with. The signature ensures that any attempt to tamper with the media asset locator will be detected, enabling rejection of that media asset locator as invalid.

Figure 9:
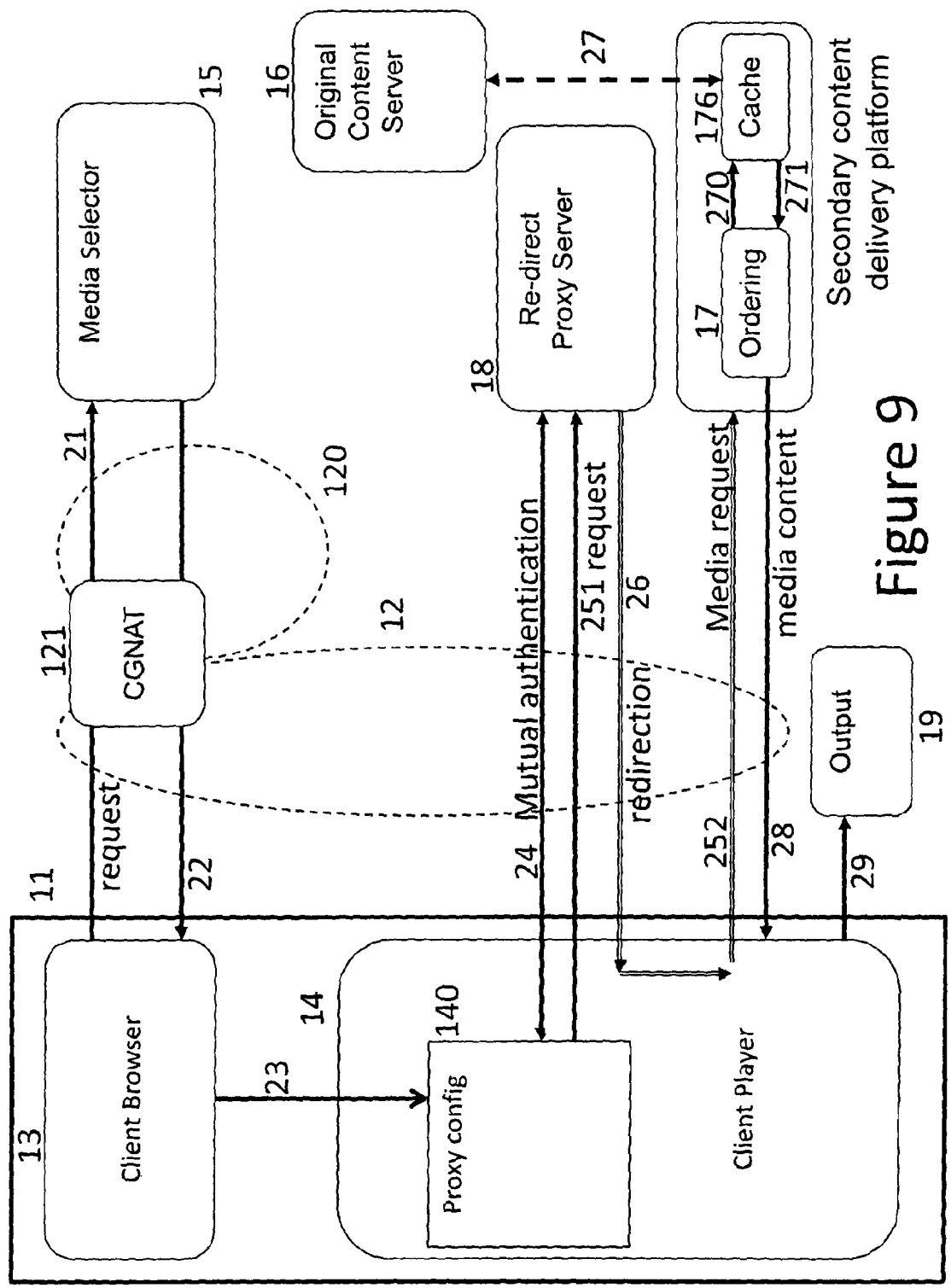
FIG. 9 illustrates a system in which carrier grade network address translation is in use.

The user terminal may be accessed by Carrier Grade Network Address Translation (CGNAT). CGNAT is a widely used method of coping with the exhaustion of the IPv4 (32-bit) address space, as an interim measure during the transition to IPv6 (128-bit addresses). It provides each client with a public IPv4 address shared with several other clients of the same service provider, but they each also have a separate "private" IP address for use within the network of the service provider for distribution of data to its own individual subscribers. FIG. 9 is a schematic depiction of an interface between a service provider's own network 12 and the public network 120.

The translation between public and private URIs takes place at the interface 121 between the service provider's own network 12 and the rest of the network 120. Only the public IP address is visible to external parties, and the private IP address is only visible to the local network. Thus, the external media selector 15 would authenticate the user's public URI, which is shared with many other users, but the URI subsequently presented to the secondary media server 17, provisioned by the service provider, would use the private IP. The proxy redirection solution with re-signing avoids this difficulty, because the redirection server 18 generates a new signature (authentication) of the request using the private IP address which is subsequently presented to the media server 17.

This facility also allows certain example embodiments of the invention to be used to enable a small internet service provider, or a small private network such as a hotel or small business, to provide access to content specific to its users using an externally hosted content provider. Access to the redirection server 18 is only possible from user terminals having the corresponding proxy configuration 140 installed, and only requests authenticated by the redirection server 18 are accepted by the media platform 17. A service provider may host multiple content delivery platforms 17, each only accessible by user terminals 11 having the appropriate respective configuration 141 allowing authentication using a respective redirection and authentication server 18.

Figure 10:
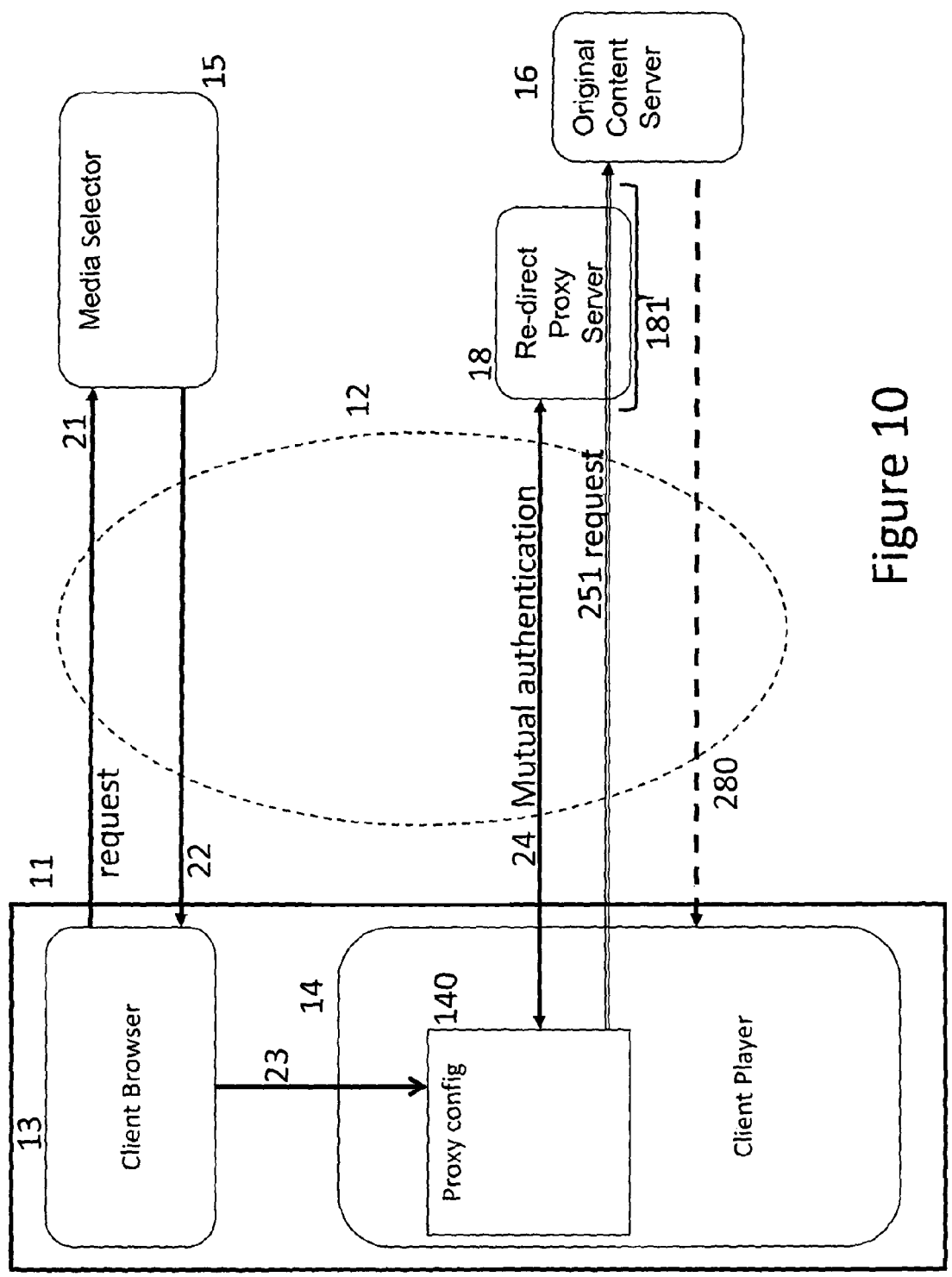
FIG. 10 illustrates a conventional connection between a user terminal and a proxy server when conveying secure data.

A difficulty can arise if the Content Provider operates a media selector 15 which returns a Media Access Locator 22 that specifies a secure scheme e.g. the URI is in "https" format. Content providers do this to ensure that the connection between the user 11 and content delivery server 16, 170 is secure. As shown in FIGS. 6 and 10, conventional user terminal software handles secure (https) data that is to be transmitted via a proxy server (18) by attempting to set up a secure "tunnel" 181 between the user terminal 11 and the specified location via the proxy 18, so that the only the user and the specified location have access to the secure data. For a secure (https) address, the message compiler 44 would generally set up a secure link 181 between the user terminal and the address specified, (tunnel generation function 441) to be routed by way of the specified proxy. Referring again to FIG. 2, the media access locator 251 would therefore not be visible to the proxy server 18 itself. Such an arrangement would not be suitable if the proxy is required to redirect the media asset location request 251, as the secure connection 181 would prevent the proxy redirect server from reading the media asset request, or doing anything with it other than forward it to the specified URI 16. However, for present purposes the proxy must be able to read the media asset location 251 in order to generate the redirected media asset location 26.

This problem may be avoided by configuring the user terminal client player 14 (FIG. 6) so that the incoming message processor 41 includes a discrimination function 411 which identifies incoming asset location addresses 23 arriving from a specified source (media asset location server 15), or of a specified type (e.g. locations for media assets) and directs the message compiler 44 to handle such requests by setting up a secure connection only between the user terminal 14 and the redirect server 18, so that the redirect server 18 can process the request 251 passed over the connection. For such media access location requests, the tunnel starting at the user terminal 11 therefore terminates at the proxy server 18. However, the user terminal is arranged so that secure media access locators 251 are passed on to the proxy redirection 18 via a mutually authenticated channel that is based on the identity of the proxy redirection itself, as opposed to the identity of the CDN server 18 identified by the Media Access Locator 251. This differs from typical client device behavior when proxying https requests, which usually entails setting up a secure tunnel 181 to the destination server via the proxy 18, such that the proxy 18 is unable to decrypt the contents. The user terminal 11 handles secure data location addresses that are to be handled by a proxy server, other than media access locators, by setting up a secure tunnel 181 to a server specified by the media access locator, by way of the proxy 18, in the usual way.

Referring again to FIGS. 2 and 3, the secure redirection server 18 assesses the incoming media asset location address (URL) 251, constructs a new URI and signature that is appropriate for the content delivery network 17, and sends this back to the client 14 using a redirection response 26. The secure redirection server 18 only accepts requests from trusted authenticated clients which have satisfied the authentication process 24, so it is not possible for a rogue client to use the proxy to bypass the original media server's URI signature.

The redirection server 18 checks the authentication certificate, (e.g. by applying a public key to decrypt the certificate sent by the client player). Authentication messages that will be recognized by the validity checker 35 in the redirection server 18 can only be generated by a client player 14 having a valid certificate 43 installed so, provided the network operator maintains control of the installation process for the configuration application 140, the operator can be sure that any client player 14 generating authentication messages 24 is doing so under the operator's authority.

The proxy name retrieval system 32 creates a new address URI by substituting the domain name of the original media source 15 by that of the delivery platform 17, also providing a signature and time stamp or other authentication data which is verifiable by the media player 17. The new details are returned to the client player 14 (step 25). To avoid tampering by the user terminal 11, a secure connection is set up between the redirect server 18 and the secondary content server 17, and the redirect request 26, 252 tunnelled directly to the secondary content server 17, including an instruction to return the requested content 28 to the client player 14 from which the original request 251 was received.

Figure 7:
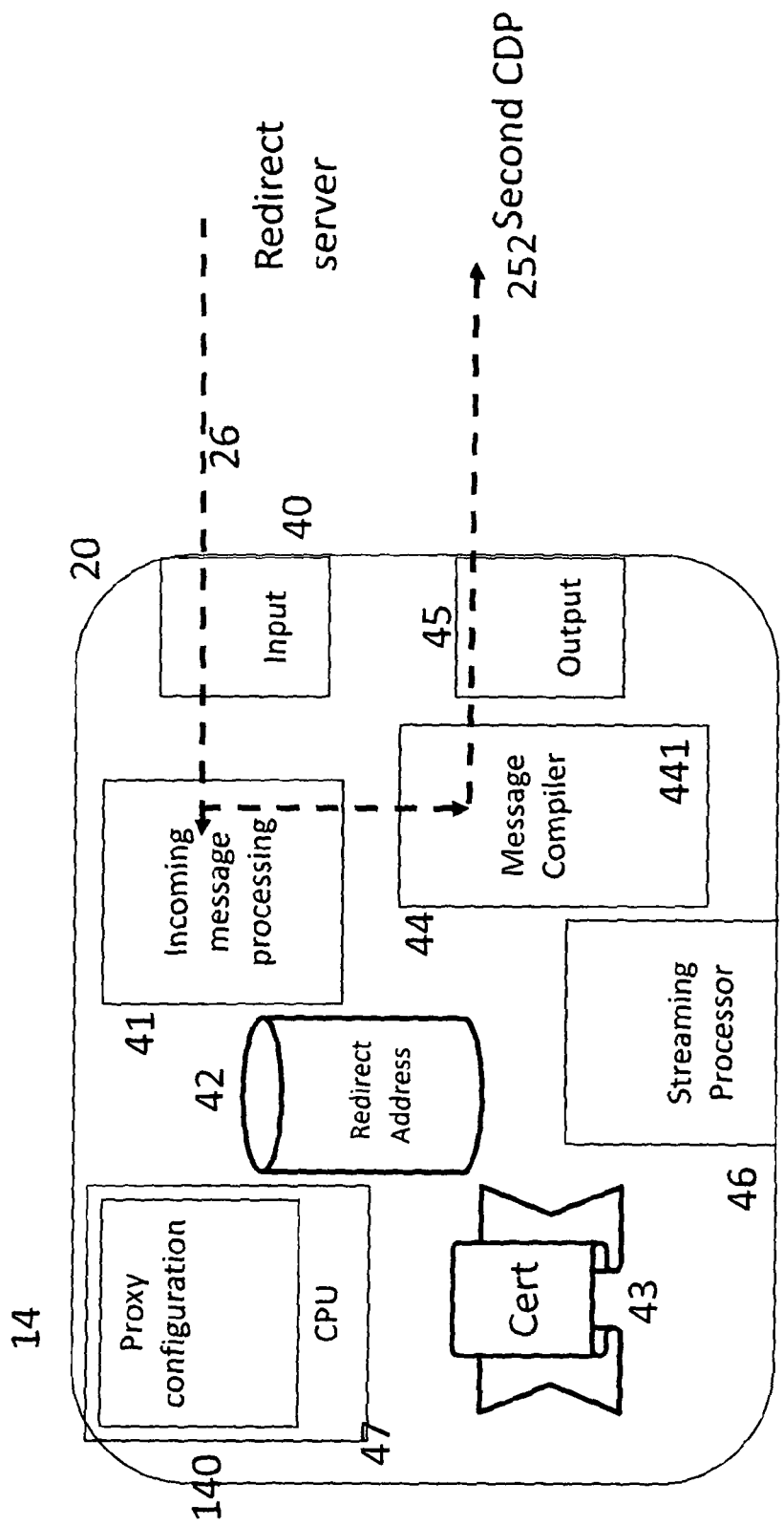
FIG. 7 is a schematic diagram illustrating the functional elements of a client player configured to operate according to certain example embodiments of the invention, and illustrates a second redirection step

Referring now to FIG. 7, the client player 20 receives the new media asset request data 25 (which, as indicated above, carries a signature that can only be validated by the secondary content server, so the user of the terminal 11 cannot read it directly, or tamper with it) and compiles it into a new message 26 to be sent to the platform 17, carrying the details in the data 25 received from the redirection server 18. This ensures that the secondary content delivery server 17 only receives media requests 252 that have been recently generated by the redirect server 18.

Referring once again to FIGS. 2 and 3, the platform 17 checks the time stamp and other authentication data in the media request 26 it receives from the client player 14. The authentication data provides proof that the client player making the request has had the proxy configuration 140 installed. Since download of this configuration is under the control of the service provider, the necessary authentication 24 will only be present if the service provider has authorized the client player to use the service.

The media location request 24 also includes a time stamp. This is checked by the platform 17 to ensure that the request 26 was generated in response to a very recent response from the media selector 12, and thus that the data requested has not been withdrawn by the original data provider 16. This ensures that each accession through the platform 17 is made in response to an original request made to the host media selector 15, allowing the original provider to retain an overview of all such requests, and to control access to the data.

In particular time-expired media assets cannot be accessed: if a user 14 attempts to use a stored copy of the new media asset locator held in the redirected request 26 the asset locator 24, the redirection server 17 will reject it as time expired. If the user attempts to generate a new redirection message, by using the browser to connect with the media selector platform 15 associated with the media asset's originator, the request will be rejected because the service provider has disabled access to that content.

Moreover, the requests 24, 26 cannot be copied and used by unauthorized client players because they are unable to be authenticated for connection to the proxy redirection server 17 and content delivery platform 18, as they do not have the private key held in the proxy configuration 140. If the authentication details are verified, the delivery platform 17 first checks the data cache 176 to determine if the requested media data file is present in the cache (step 270), and retrieves it from the cache if it is present (step 271). However, if this is the first request for that resource material, and it is therefore not already present in the cache, the platform 17 sources the asset from the original source 16 (step 27). As well as delivering the data to the user terminal 14 (step 271), the platform also stores a copy in its data cache 176 for easier retrieval in response to subsequent requests.

As described above, it is also possible to modify the content to be transmitted in response to requests, for example by removing material, replacing it with material tailored to individual user interests, geographical factors, etc, or providing value-added content such as subtitles to the original material. This could be achieved by extracting and modifying the relevant material for storage in the cache 176 before any request has been made for it. Different versions may be made available for different data connections 12, client player types 14 or outputs 19, identifiable to the proxy redirection server from the user identity, which can thus be used to select the appropriate redirection message for the appropriate version of the content required.

Figure 8:
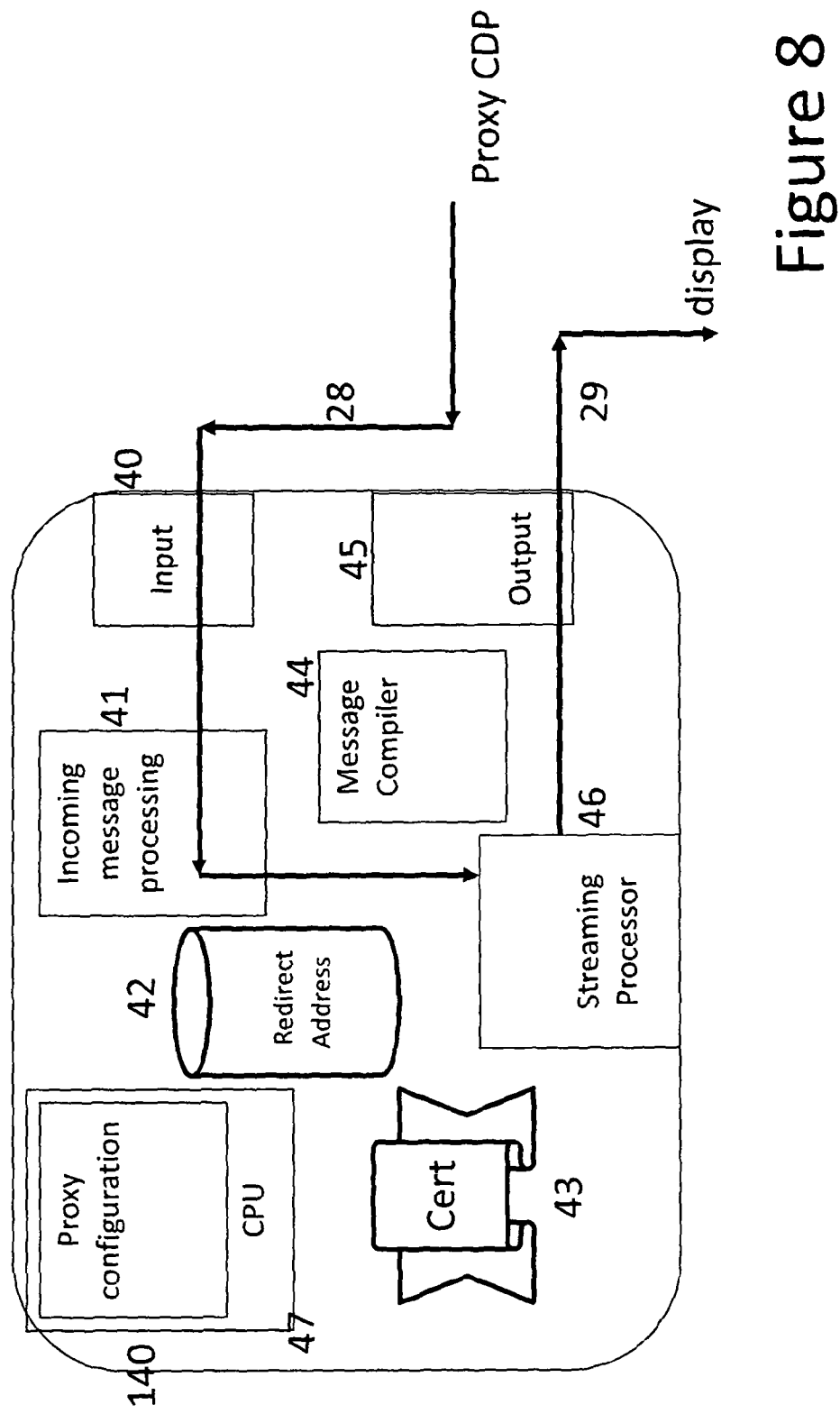
FIG. 8 is a schematic diagram illustrating the functional elements of a client player configured to operate according to certain example embodiments of the invention, illustrating a display step.

The media data file identified by the delivery platform player 17 as corresponding to the request 26 is then returned (step 28) to the client player 14. As shown in FIG. 8, the content is passed to the streaming processor 46, which processes the streamed content for output (step 29) on a device 19 such as a television set. The processing performed by the processor 46 will depend on the nature of the output display 19. Furthermore, the proxy configuration 140 may be arranged to cause the requests 26 it generates to be configured to request content in a form suitable for the particular output device 19. For example, if the user device 11 is a general purpose computer, the Internet connection 12 has a high bandwidth, and the output is a high definition television 19, a high definition, high bandwidth data stream can be requested. In contrast, if the user device 1.1 is a small portable device, with a low definition monochrome output 19, and connected to the internet 12 over a low bandwidth wireless connection, a lower bandwidth data stream with less definition would be appropriate. The ordering processor 17 would be arranged to configure the data stream 28 in accordance with the details of the request 26.

Note that platforms 16, 17 may both retain media data for a period after requests 21 for that data cease to be valid. This allows users currently viewing content at the time of expiry of availability of that to complete their downloading and viewing of that content. Furthermore, the second platform 17 would not generally be informed by the owner of the primary content delivery platform 16 of the expiry or modification of the data in its cache 176. (The secondary platform "pulls" data from the primary platform—there is no "push" of data by the primary platform). In practice the data is retained in the cache until a specified time has elapsed with no accessions having been made, or until it needs to be overwritten to accommodate a more recent download. The present invention in certain example embodiments prevents out-of-date data being accessible from the cache 176, because no accessions can be made to such data from the cache 176, except in response to a request using a valid timestamp. The proxy configuration 140 in the client player 14 will only issue such a timestamp in response to a successful response 22, 23 being received from the media selector 15.

As will be understood by those skilled in the art, aspects of the invention may be implemented in computer program product software, any or all of which may be contained on various storage media so that the program can be loaded onto one or more general purpose computers or downloaded over a computer network using a suitable transmission medium.

The computer program product used to implement aspects of the invention may be embodied on any suitable carrier, readable by a suitable computer input device, such as optically readable media and magnetic media.

The invention claimed is:

1. A user terminal for a communication system, comprising:
   at least one hardware processor;
   a message compiler for transmitting data to predetermined addresses,
   a secure connection means for transmitting data having a secure data location address to set up a secure tunnel to the address,
   a discriminator for identifying media access location data identifying a pre-defined set of known media servers, and
   second connection means for transmitting media access location data addressed to a secure location server specified by the media access locator, by way of a proxy redirection server, by suspending the establishment of a tunnel to the specified address and instead setting up a tunnel to the proxy redirection server so that secure media access locators are passable to the proxy redirection server over a connection between the user terminal and the proxy redirection server for redirection by the proxy redirection server.

2. The user terminal according to claim 1, wherein the secure connection means are further configured for setting up a mutually authenticated connection with the proxy redirection server.

3. A method for routing data messages having secure data location addresses wherein data having a secure data location address, other than media access locators, are transmitted from a user terminal by setting up a secure tunnel to a server specified by the media access locator, wherein secure media access locators identifying a pre-defined set of known media servers are passed to a proxy redirection server over a connection between the user terminal and the proxy redirection server, by suspending the establishment of a tunnel to the specified address and instead setting up a connection to the proxy redirection server, such that the proxy redirection server may generate a redirected media access locator for return to the user terminal.

4. The method according to claim 3, wherein the connection between the user terminal and the redirection server is a mutually authenticated connection.

5. A method of configuring a user terminal for a communications system by transmitting a downloadable data file to the terminal for installation on the terminal, the downloadable data file including operating instructions to configure the terminal to operate according to claim 3.

6. A user terminal for a communication system, comprising:
   a communication circuit; and
   processing resources including at least one hardware processor and a memory operably coupled thereto, the processing resources being configured to cooperate with the communication circuit and being configured to at least:
   transmit data to predetermined addresses,
   transmit data having a secure data location address to set up a secure tunnel to the address,
   identify media access location data identifying a pre-defined set of known media servers, and
   transmit media access location data addressed to a secure location server specified by the media access locator, by way of a proxy redirection server, by causing suspension of the establishment of a tunnel to the specified address and instead causing set up of a tunnel to the proxy redirection server so that secure media access locators are passable to the proxy redirection server over a connection between the user terminal and the proxy redirection server for redirection by the proxy redirection server.

7. The user terminal according to claim 6, wherein the processing resources are further configured to at least set up a mutually authenticated connection with the proxy redirection server.

8. The user terminal according to claim 6, being a handheld device.

9. The user terminal according to claim 6, being a set-top box.

10. The user terminal according to claim 6, being embodied in intercommunicating electronic devices.

11. The user terminal according to claim 6, further comprising a client player.

12. The user terminal according to claim 11, wherein the client player includes a processor, a redirection store, and a certification store.

13. The user terminal according to claim 6, being a client player.

14. The user terminal according to claim 13, wherein the media access location data identifies incoming asset location addresses arriving from a specified source.

15. The user terminal according to claim 14, wherein the specified source is a media asset location server.

16. The user terminal according to claim 13, wherein the media access location data identifies incoming asset location addresses of a specified type.

17. The user terminal according to claim 16, wherein media access location data identifies incoming asset location addresses of locations for media assets.

* * * * *